T. Earle,
Egg-Beater,
N° 39,134.
Patented July 7, 1863.
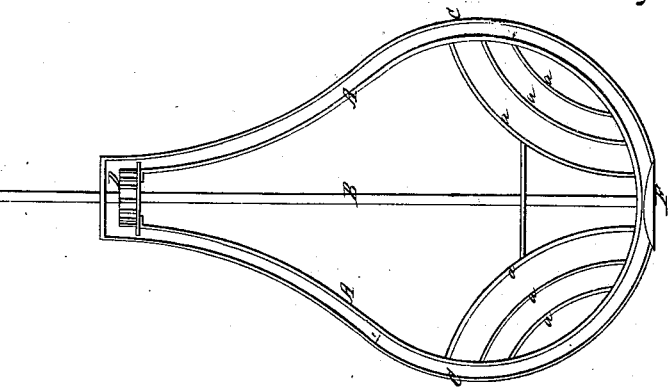
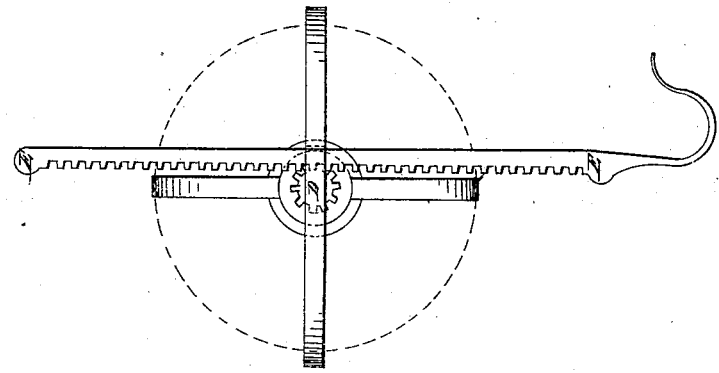
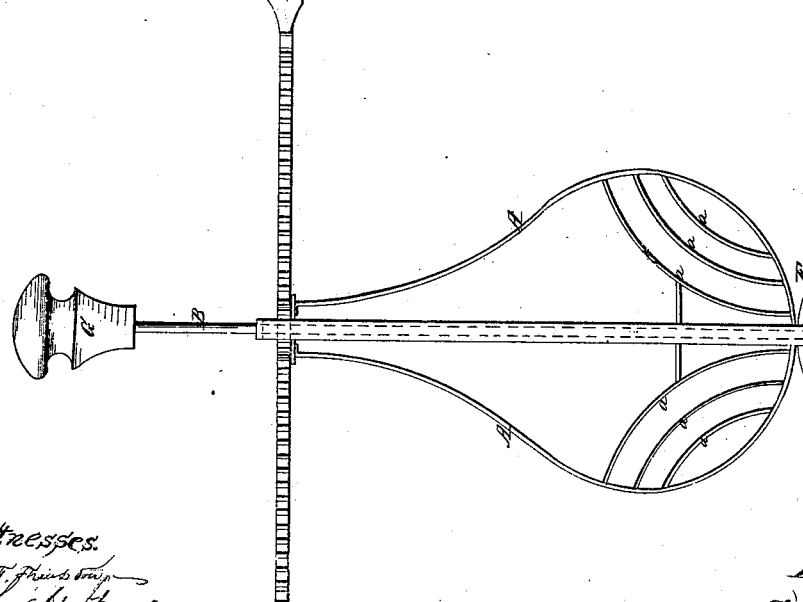
Witnesses.
Inventor:
Timothy Earle

UNITED STATES PATENT OFFICE.

TIMOTHY EARLE, OF SMITHFIELD, RHODE ISLAND.

IMPROVED EGG-BEATER.

Specification forming part of Letters Patent No. 39,134, dated July 7, 1863.

*To all whom it may concern:*

Be it known that I, TIMOTHY EARLE, of Smithfield, in the county of Providence and State of Rhode Island, have invented a new and useful Improvement in Egg-Beaters; and I do hereby declare that the following specification, taken in connection with the drawings, making a part of the same, is a full, clear, and exact description thereof.

Figure 1 is a view of the beater. Fig. 2 is a another view of the same, with the rack which works it shown. Fig. 3 is a top view of the same.

Various devices have been employed for the purpose of beating eggs more expeditiously than by the familiar hand-process. One of these devices consists of two wire-frames, one within the other, and made to revolve in opposite directions; another consists of a propeller blade inside of a wire frame, the frame and blades being made to revolve in opposite directions; and still another consists of a propeller blade which is made to rotate while a pair of beaters have at the same time a reciprocating motion. All these machines, and all others with which I am acquainted, possess the common fault that the beaters, whether of wire or of the form of propeller-blades, do not cut the yolks and whites of the egg, but literally beat them. Now, as the albumen of an egg consists of a peculiar thick, glazy substance, it can be worked more effectually with a cutting-instrument than with one which has a blunt edge. In fact, so well is this understood that housewives universally make use of the blade of a knife for the purpose.

My invention is designed to obviate the difficulty referred to, and consists in the use of a frame, A, Fig. 1, mounted on a spindle, B, around which it can freely rotate. An outer frame, C, of the same general form as the inner one, but large enough to permit the inner frame to rotate within it, is attached to the spindle B, and furnishes a support for it. The inner frame is provided with a series of cutters, *a a a a*, arranged in any manner suitable for cutting the fluid in many different planes. These cutters are simply pieces of sheet-tin, or other suitable metal, of the width of the inner frame, and so placed that their edges shall cut the material to be agitated when the frame A is rotated. Upon the top of the frame A is attached a toothed wheel, D, through which by means of the rack E, Fig. 3, worked by the hand, a rotaty motion is given in alternate directions.

When the machine is to be used, it is placed with its foot F resting upon the bottom of the vessel containing the broken eggs. The left hand bears upon the handle G, and holds the machine in position. The rack E, held by the handle in the right hand, is engaged with the pinion D, and the proper motion imparted to the frame A.

It is obvious that a continuous rotary motion may be easily imparted to the frame A by means of a crank and suitable gearing, and the beneficial effects of the cutters *a a a* would be obtained as well, but I prefer the method described of communicating motion to the frame, for the reason that the machine is more easily cleaned, and is more convenient for domestic use.

What I claim as my invention, and desire to secure by Letters Patent, is—

The use of a series of cutting-edges *a a a a*, when attached to a frame A, which is capable of being rotated, substantially as described, for the purpose specified.

In testimony whereof I have hereunto set my hand this 19th day of December, A. D. 1862.

TIMOTHY EARLE.

Witnesses:
BENJ. F. THURSTON,
JOHN H. STINESS.